United States Patent [19]

Akers et al.

[11] Patent Number: 4,799,728

[45] Date of Patent: Jan. 24, 1989

[54] VEHICLE COVER

[76] Inventors: Cliff Akers, 336 Bangor Ave., San Jose, Calif. 95123; Richard N. James, 4911 Kenson Dr., San Jose, Calif. 95124

[21] Appl. No.: 152,950

[22] Filed: Feb. 8, 1988

[51] Int. Cl.[4] .............................................. B60J 11/00
[52] U.S. Cl. ................................. 296/136; 296/95.1; 160/370.2
[58] Field of Search ........................... 296/95 C, 136; 160/370.2

[56] References Cited

U.S. PATENT DOCUMENTS 4,355,839 10/1982 Rosen ........................... 160/370.2 X

FOREIGN PATENT DOCUMENTS

| 45-31207 | 12/1970 | Japan | 296/136 |
| 54-23706 | 8/1979 | Japan | 296/136 |
| 2127365 | 4/1984 | United Kingdom | 296/95 C |

Primary Examiner—Robert B. Reeves
Assistant Examiner—Brian K. Sells
Attorney, Agent, or Firm—Gerald L. Moore

[57] ABSTRACT

A cover [20] for a vehicle body [11] including a hood [21] fixed to a bag [29] by a strap [28], which bag can be placed inside a vehicle door [18] and the door closed to prevent unauthorized removal. The bag is also sized to contain the cover for storage. Additionally, a hook assembly [32] including a semipliable member [34] is fixed to the strap [24] and used to hold the hood on the vehicle while allowing easy adjustment of the strap length.

2 Claims, 1 Drawing Sheet

VEHICLE COVER

BACKGROUND OF THE INVENTION

1. Field of the Invention

This invention relaets to removable flexible covers for automotive vehicles to protect them from the weather.

2. Description of the Prior Art

Flexible covers for vehicles, which are placed over the vehicle body when not being used, are becoming more and more popular, especially in view of the cost of the vehicles. In order to reduce the cost it is important to make the cover so that each size will fit as many vehicles as possible. This involves making the straps so that they are adjustable.

One other problem involves the storage of the cover when not being used on the vehicle. Naturally, such covers can become dusty or wet thereby making the immediate storage in the vehicle difficult. Additionally, it is importnt to discourage the unauthroized removal of the covers because replacement costs can be substantial.

Accordingly, it is the primary purpose of the subject invention to provide a cover for vehicles incorporating a convenient bag for storing the cover when not in use, which bag serves the double purpose of discouraging the unauthorized removal and theft of the cover and also utilizing a unique strap assembly for attachment to the vehicle.

SUMMARY OF THE INVENTION

A cover for a vehicle including a hoodmade of flexible weatherproof material and shaped to fit over at least a portion of the vehicle body with straps attached thereto terminating at a hook assembly that is adjustable to adapt the cover for use with various vehicles. The hook assembly includes a flat semipliable member around which the extending strap end can be wound, with a flexible sheath fitting thereover to prevent unwinding whereby the semipliable member can be bent into a hook shape for fitting under fender wells and the like of the vehicle to hold the hood in place. Additionally, a bag is provided made of flexible material and of sufficient size to hold he hood, which bag is fixed directly to the hood at a point adjacent a door or window of the vehicle such that the bag can be inserted through the opening and the closure closed to attach the cover to the vehicle.

DESCRIPTION OF PREFERRED EMBODIMENT OF THE INVENTION

Figure 1:
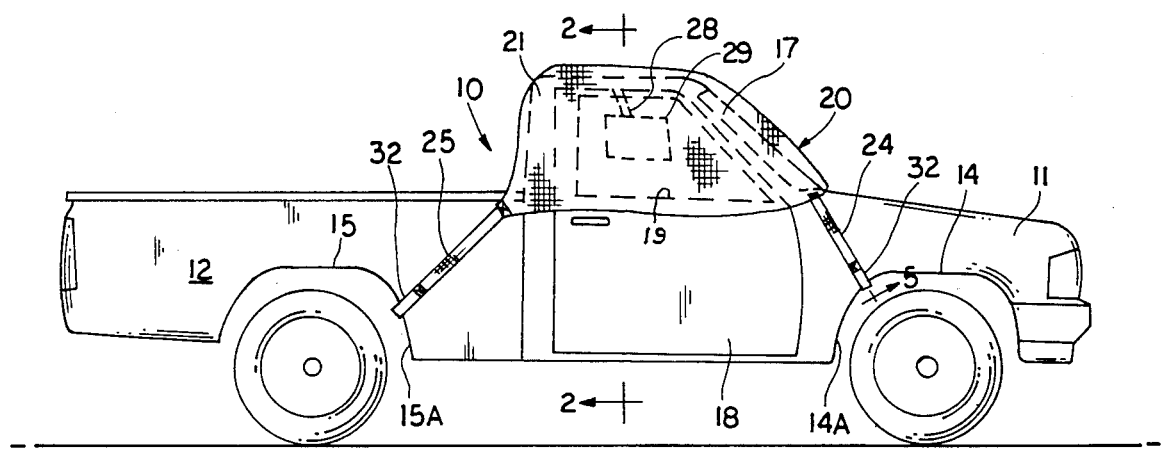
FIG. 1 is a side view of a vehicle with a cover made in accordance with the present invention in place.

In FIG. 1 is shown a pickup truck which is a typical example of an application for the subject invention. The truck comprises a vehicle body 11 with an attached vehicle bed 12 and fenders 14 and 15 at the front and rear, respectively. The vehicle body includes a windshield opening 17, a side door opening 18 and a side window opening 19.

Typically, the vehicle owner desires to cover the windshield and side window areas to protect against the sun reaching the windows of the cab to heat up the interior and deteriorate the interior parts. Also covering the glass areas prevents the formation of ice and allows the easy removal of snow with the removal of the covering. THe invention is embodied in the cover 20 which fits over the top of the vehicle body surrounding the window area and comprises a hood 21 made of a weatherproof flexible material formed to conform to the vehicle body portion. The hood is maintained on the body by a plurality of straps 24 and 25 which extend down to the edges 14A and 15A of the fenders 14 and 15, respectively.

Figure 2:
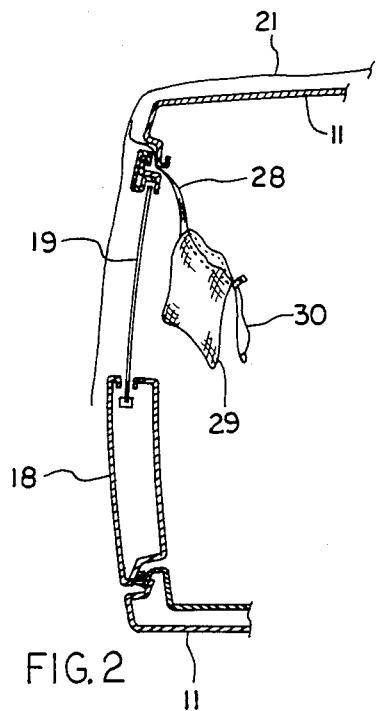
FIG. 2 is a cross sectional view along the line 2—2 of FIG. 1.

In accordance with one feature of the invention there is attached to the hood at any convenient location, a strap 28 preferably positioned close to or adjacent a window or door opening. This strap extends to a bag 29 that is made of a flexible material and is large enough to hold the complete cover. When it is desired to place the cover on the vehicle, the strap 28 is extended through a door opening as shown in FIG. 2 such that the strap can be placed through the opening and the door 18 closed. In this manner the bag 29 extends inside the vehicle cab and serves to prevent removal of the cover so long as the vehicle door is closed. Thus, by locking the vehicle door the cover is secured to the vehicle thereby serving to deter theft or unauthorized removal. The bag serves to prevent the strap from being pulled from between the door and the vehicle body because of its larger bulk, yet serves the dual purpose of also providing a storage container for the cover. The bag is closed by a drawstring 30 when the cover is placed therein.

Figure 4:
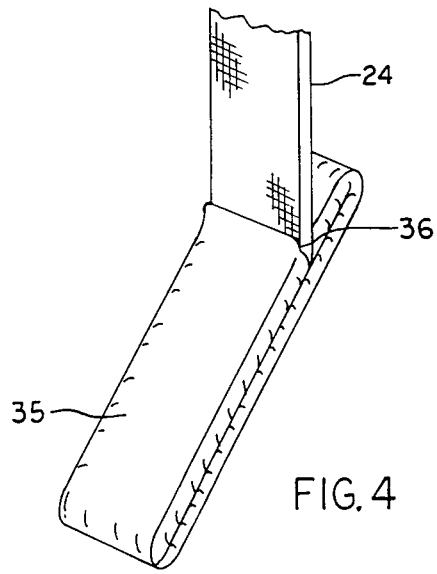
FIG. 4 is a perspective view of the hook assembly for the cover.
Figure 3:
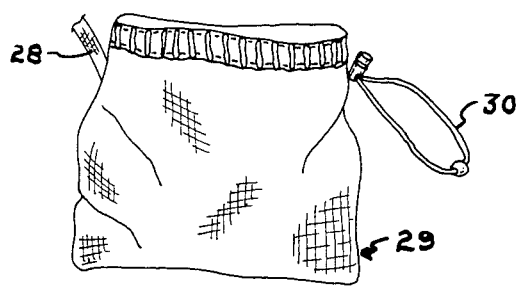
FIG. 3 is an enlarged view of the storage bag for the cover.
Figure 5:
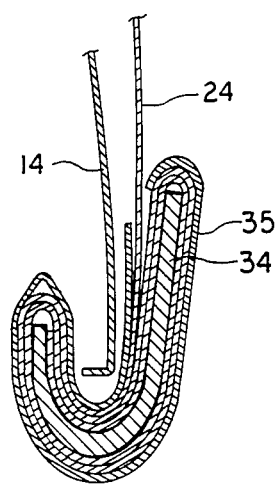
FIG. 5 is a cross sectional view of the hook assembly formed around a fender well of the vehicle.

In accordance with a second feature of the invention, the straps 24 and 25 are terminated in hook assemblies 32 shown in FIGS. 4 and 5. The hook assembly comprises an internally positioned semipliable planar member 34 around which the strap 24 is shown wound. The number of windings depends upon the desired length for the strap. Thus if the strap 24 is to extend to the front fender well it is obviously shorter than the strap 25 extending to the back fender well as shown in FIG. 1. Thereafter, an outside flexible sheath 35 is placed over the combination of the member 34 and the wound strap 24 to prevent unwinding of the strap. For this purpose the sheath is sized to fit over the combination of strap and semipliable member with the strap extendingout an opening 36 in one side wall of the sheath. By this structure the planar member is prevented fromturning within the sheath whichotherwise would permit unwinding of the strap.

Additionally the strap windings and the sheath protect the vehicle body against being scratched by the semipliable membe.

As shown in FIG. 5 the hook assembly is thereafter extended down past the fender 14 and bent therearound to the contour of the fender to serve as a hook for holding the cover in place. The semipliable member is made of a material such as aluminum which will retain the bent configuration after it is folded around the fender edge.

From the foregoing it is obvious that there is provided a simple and convenient cover for vehicles and the like which deters unauthorized removal and yet effectively covers and protects the vehicle body.

I claim:

1. A cover for a vehicle having a vehicle body with openings and closures for the openings, said cover comprising:
- a hood formed to fit over at least a portion of the vehicle body;
- a bag of sufficient size to hold said hood for storage;
- first attachment means for fastening said cloth bag to said hood at a place adjacent an opening whereby the bag can be inserted through said opening and the closure closed to fasten said hood to said vehicle body;
- at least one second attachment means comprising a second elongated strap;
- means attaching a first end of said second strap to said hood;
- a semipliable planar member around which the second end of said second strap is wound; and
- a sheath into which said planar member and wound second strap second end can be inserted to prevent unwinding of said second strap second end from said planar member while allowing said planar member to be bent around an edge of said vehicle body to hold said hood on said vehicle body.

2. A cover for a vehicle body comprising:
- a hood formed to fit over at least a portion of said vehicle body;
- at least one elongated strap for holding said hood on said vehicle body and having two ends;
- means attaching a first end of said strap to said hood;
- a semipliable member about which the second end can be wound with the number of windings being determined by the desired length of the strap; and
- a sheath sized to fit over said pliable member and wound strap second end to prevent the second end from unwinding from said pliable member whereby the hood is fitted over the vehicle body and the srap extended to a vehicle edge and bent therearound.

* * * * *